United States Patent
Kim

(10) Patent No.: US 9,897,510 B2
(45) Date of Patent: Feb. 20, 2018

(54) SYSTEM AND METHOD FOR DETECTING WATER-LEAKING PART OF VEHICLE

(71) Applicant: HYUNDAI MOTOR COMPANY, Seoul (KR)

(72) Inventor: Tae Ho Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 31 days.

(21) Appl. No.: 15/194,228

(22) Filed: Jun. 27, 2016

(65) Prior Publication Data

US 2017/0016798 A1   Jan. 19, 2017

(30) Foreign Application Priority Data

Jul. 15, 2015   (KR) ........................ 10-2015-0100144

(51) Int. Cl.
G01M 3/24 (2006.01)
G01M 17/00 (2006.01)
G01H 11/06 (2006.01)

(52) U.S. Cl.
CPC .............. *G01M 3/24* (2013.01); *G01M 17/00* (2013.01); *G01H 11/06* (2013.01)

(58) Field of Classification Search
CPC .................................. G01M 3/24; G01N 29/24
See application file for complete search history.

(56) References Cited

U.S. PATENT DOCUMENTS

| | | | | |
|---|---|---|---|---|
| 3,903,729 A | * | 9/1975 | Covington | F17D 5/06 73/40.5 A |
| 4,075,601 A | * | 2/1978 | Flournoy | G01H 1/00 367/13 |
| 4,719,801 A | * | 1/1988 | Blaser | G01L 3/24 73/40 |
| 4,823,600 A | * | 4/1989 | Biegel | G01M 3/243 73/40.5 A |
| 4,856,321 A | * | 8/1989 | Smalling | G01F 1/662 73/40.5 A |

(Continued)

FOREIGN PATENT DOCUMENTS

| | | |
|---|---|---|
| JP | H09-159656 A | 6/1997 |
| JP | 2000-258281 A | 9/2000 |

(Continued)

OTHER PUBLICATIONS

Machine Translation of Republic of Korean Patent KR-101185368 B1 originally published on Sep. 24, 2012.*

*Primary Examiner* — David A Rogers

(74) *Attorney, Agent, or Firm* — McDermott Will & Emery LLP

(57) ABSTRACT

A system for detecting a water-leaking part of a vehicle comprises; a sound wave generator disposed in a vehicle; a plurality of acoustic sensors disposed outside the vehicle and receiving a sound wave generated by the sound wave generator; a time-reversed signal generator configured to time-reverse sound wave signals received by the acoustic sensors and to transmit the time-reversed sound wave signals to the vehicle; and a controller configured to determine whether the vehicle has the water-leaking part based on the sound wave signals received by the acoustic sensors and the time-reversed sound wave signals generated by the time-reversed sound wave signal generator.

10 Claims, 6 Drawing Sheets

(56) References Cited

U.S. PATENT DOCUMENTS

| | | | | |
|---|---|---|---|---|
| 4,901,576 A | * | 2/1990 | Rademacher | G01M 3/24 73/588 |
| 4,987,769 A | * | 1/1991 | Peacock | G01M 3/24 73/40.5 A |
| RE33,977 E | * | 6/1992 | Goodman | G01M 3/24 73/40.5 A |
| 5,398,542 A | * | 3/1995 | Vasbinder | G01M 3/243 73/40.5 A |
| 5,452,263 A | * | 9/1995 | Heitman | G01S 5/22 367/120 |
| 5,726,705 A | * | 3/1998 | Imanishi | G01N 21/8806 348/92 |
| 6,404,343 B1 | * | 6/2002 | Andou | G01M 3/243 340/605 |
| 6,430,988 B1 | * | 8/2002 | Watanabe | G01M 3/24 73/40.5 A |
| 6,826,497 B1 | * | 11/2004 | Collins | H04L 67/12 702/81 |
| 6,983,642 B2 | * | 1/2006 | Stumpf | G01M 3/24 73/40.5 A |
| 7,266,992 B2 | * | 9/2007 | Shamout | G01M 3/243 73/40.5 A |
| 7,765,073 B2 | | 7/2010 | Bricker | |
| 7,987,720 B2 | * | 8/2011 | Gayle | G01N 29/348 73/40.5 A |
| 8,365,580 B2 | * | 2/2013 | Stumpf | G01M 3/24 73/40.5 A |
| 8,542,124 B2 | * | 9/2013 | Timm | G01M 3/24 340/605 |
| 2007/0107497 A1 | | 5/2007 | Farrell | |
| 2009/0025454 A1 | | 1/2009 | Farrell et al. | |
| 2012/0079872 A1 | * | 4/2012 | Schaefer | G01M 3/243 73/40.5 A |

FOREIGN PATENT DOCUMENTS

| | | |
|---|---|---|
| JP | 2010-112894 A | 5/2010 |
| KR | 10-1185368 B1 | 9/2012 |

* cited by examiner

-- Prior Art --

-- Prior Art --

-- Prior Art --

SYSTEM AND METHOD FOR DETECTING WATER-LEAKING PART OF VEHICLE

CROSS-REFERENCE TO RELATED APPLICATION

This application claims under 35 U.S.C. § 119(a) the benefit of priority to Korean Patent Application No. 10-2015-0100144 filed on Jul. 15, 2015, the entire content of which is incorporated herein by reference.

TECHNICAL FIELD

The present disclosure relates to a system and method for detecting a water-leaking part of a vehicle. More particularly, the present disclosure relates to a system and method for detecting a water-leaking part of a vehicle that are capable of easily detecting the water-leaking part of the vehicle using a time-reversal technique.

BACKGROUND

In general, a vehicle has a weather strip mounted to doors and a tailgate thereof as a sealing member to prevent raindrops from being introduced into the vehicle. The vehicle further has a trench drain for drainage at a chassis, in which the doors and the tailgate are disposed, and a cowl panel, which is adjacent to an engine room.

However, water may leak into the vehicle when there is a defect in the weather strip or chassis.

For this reason, automobile manufacturers have performed multiple water leakage inspections on vehicles.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art, and an object of the present disclosure is to provide a system and method for detecting a water-leaking part of a vehicle that are capable of easily detecting the water-leaking part of the vehicle using a time-reversal technique, in which a sound wave generated by a sound wave generator, disposed in the vehicle, is received by acoustic sensors, the received sound wave signals are time-reversed, and the time-reversed signals are transmitted to the vehicle.

According to an embodiment in the present disclosure, a system for detecting a water-leaking part of a vehicle includes: a sound wave generator disposed in the vehicle; a plurality of acoustic sensors disposed outside the vehicle for receiving a sound wave generated by the sound wave generator; a time-reversed signal generator configured to time-reverse sound wave signals received by the acoustic sensors and to transmit time-reversed signals to the vehicle; and a controller configured to determine whether the vehicle has a water-leaking part based on the sound wave signals received by the acoustic sensors and the time-reversed signals generated by the time-reversed signal generator.

The system may further include a signal synthesizer configured to synthesize the sound wave signals received by the acoustic sensors and the time-reversed signals generated by the time-reversed signal generation unit.

The signal synthesizer may separately transmit a signal obtained by synthesizing the sound wave signals received by the acoustic sensors and the time-reversed signals at the water-leaking part and a signal obtained by synthesizing the sound wave signals received by the acoustic sensors and the time-reversed signals at a non-water-leaking part to the controller.

The controller may determine that water is leaking from the vehicle when a signal obtained by synthesizing the sound wave signals received by the acoustic sensors and the time-reversed signals at the water-leaking part is greater than the sound wave signals received by the acoustic sensors.

The system may further include a warning unit for warning water leakage according to a signal from the controller when the controller determines that water is leaking from the vehicle.

According to another embodiment in the present disclosure, a method of detecting a water-leaking part of a vehicle includes disposing a sound wave generator in the vehicle and disposing a plurality of acoustic sensors outside the vehicle (a water leakage inspection setting step), receiving a sound wave generated by the sound wave generator in acoustic sensors, time-reversing sound wave signals received by the acoustic sensors and transmitting the time-reversed signals to the vehicle (a time-reversed signal generation step), and determining, in a controller, whether the vehicle has a water-leaking part based on the sound wave signals received by the acoustic sensors and the time-reversed signals generated at the time-reversed signal generation step.

The method may further include synthesizing the sound wave signals received by the acoustic sensors and the time-reversed signals.

The signal synthesis step may include separately synthesizing a signal obtained by synthesizing the sound wave signals received by the acoustic sensors and the time-reversed signals at the water-leaking part and a signal obtained by synthesizing the sound wave signals received by the acoustic sensors and the time-reversed signals at a non-water-leaking part.

The step of controller determining whether the vehicle has the water-leaking part may include the controller determining that water is leaking from the vehicle when a signal obtained by synthesizing the sound wave signals received by the acoustic sensors and the time-reversed signals at the water-leaking part is greater than the sound wave signals received by the acoustic sensors.

The method may further include warning water leakage when the controller determines that water is leaking from the vehicle, Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

Figure 1:
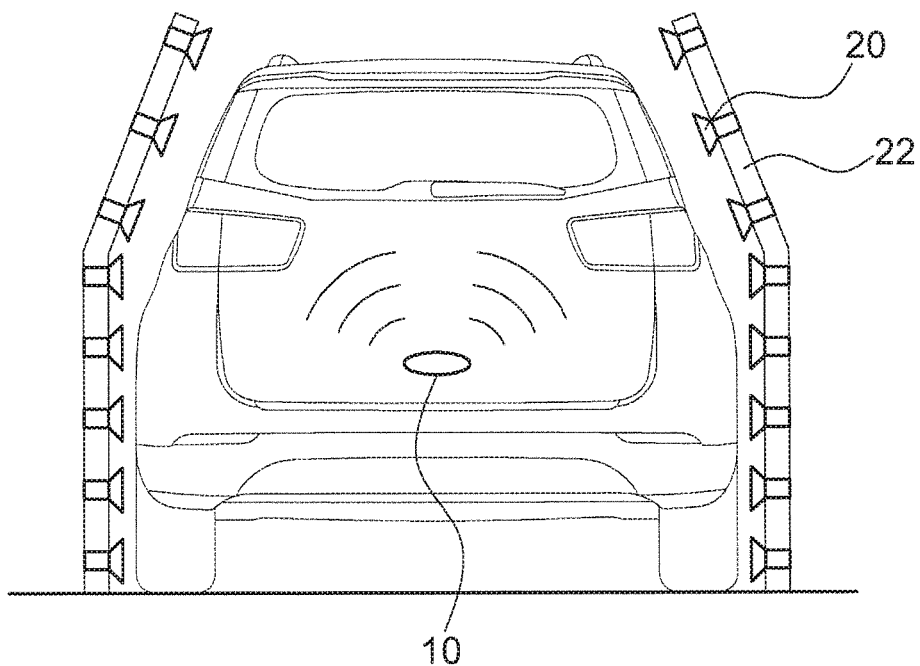
FIG. 1 is a view schematically showing a construction for inspecting water leakage from a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

First, a conventional method of inspecting water leakage from a vehicle will be described.

Figure 2:
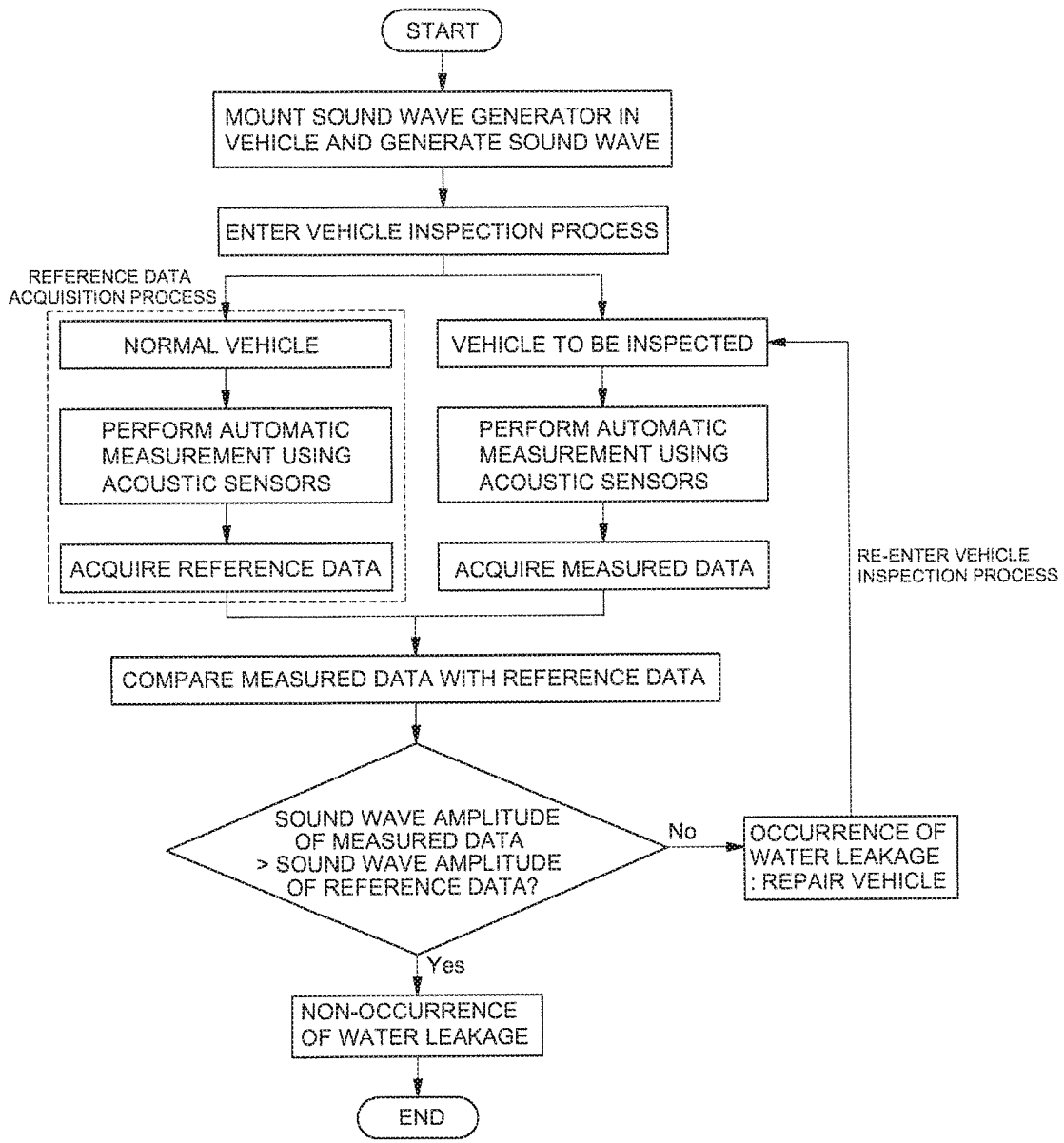
FIG. 2 is a flowchart showing a conventional process of inspecting water leakage from a vehicle.

FIG. 1 is a view schematically showing a construction for inspecting water leakage from a vehicle, and FIG. 2 is a flowchart showing a conventional process of inspecting water leakage from a vehicle.

As shown in FIG. 1, a sound wave generator 10 is disposed in a vehicle, and an acoustic sensor stand 22, to which a plurality of acoustic sensors 20 is mounted, is disposed around the vehicle.

When the sound wave generator 10 generates a sound wave in this water leakage inspection setting state, each acoustic sensor measures amplitude of the sound wave and transmits the measured data to a controller, which determines water leakage.

The controller stores reference data for all water leakage measurement parts of the vehicle (data about the amplitude of the sound wave in a non-water-leaking state). The reference data are obtained in advance through experimentation on a normal vehicle.

The data (the actual amplitude of the sound wave) measured by each acoustic sensor are compared with the reference data in order to determine the part of the vehicle from which water is leaking.

Figure 3:
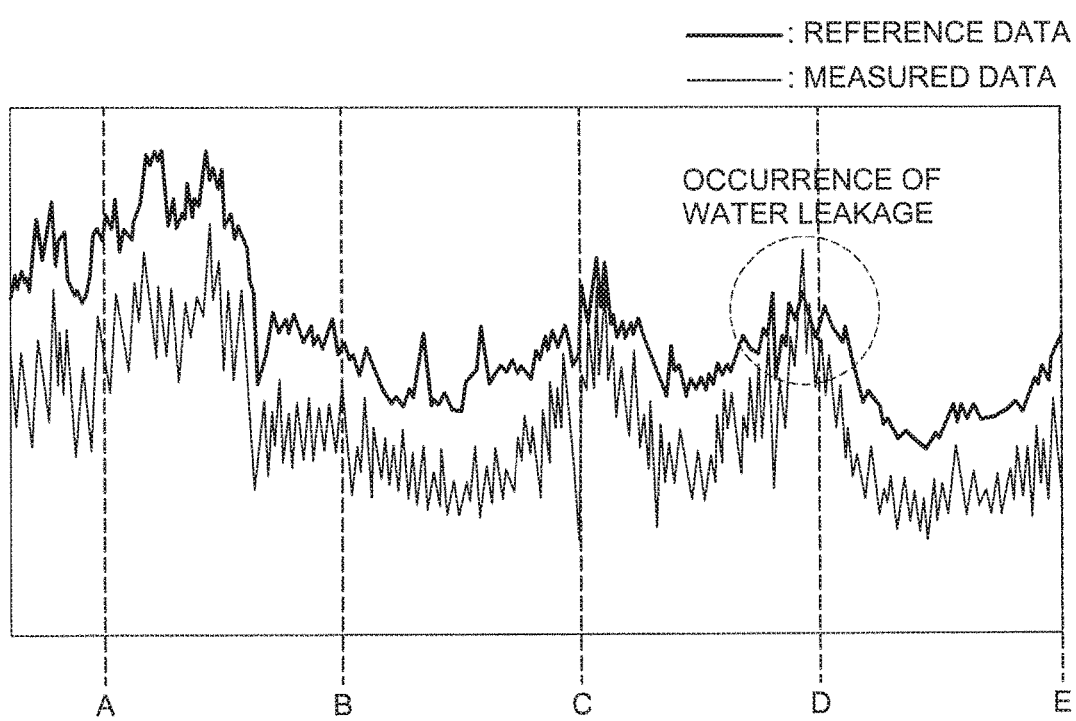
FIG. 3 is a graph showing a conventional method of inspecting water leakage from a vehicle.

For example, referring to FIG. 3, when the data measured by five acoustic sensors A, B, C, D, and E are compared with the reference data and the data measured by the acoustic sensor D exceeds the reference data, the controller determines that the vehicle has a water-leaking part.

However, according to the conventional water leakage inspection method, a preliminary operation for water leakage inspection is complicated and it takes a long period of time to inspect water leakage since reference data must be prepared for each vehicle model in advance.

In addition, errors may occur since only the amplitude of the sound wave measured from a water-leaking part of the vehicle is compared with that of the reference data.

Therefore, an aspect of the present disclosure provides a system and method for detecting a water-leaking part of a vehicle that are capable of easily detecting the water-leaking part of the vehicle using a time-reversal technique.

Figure 4A:
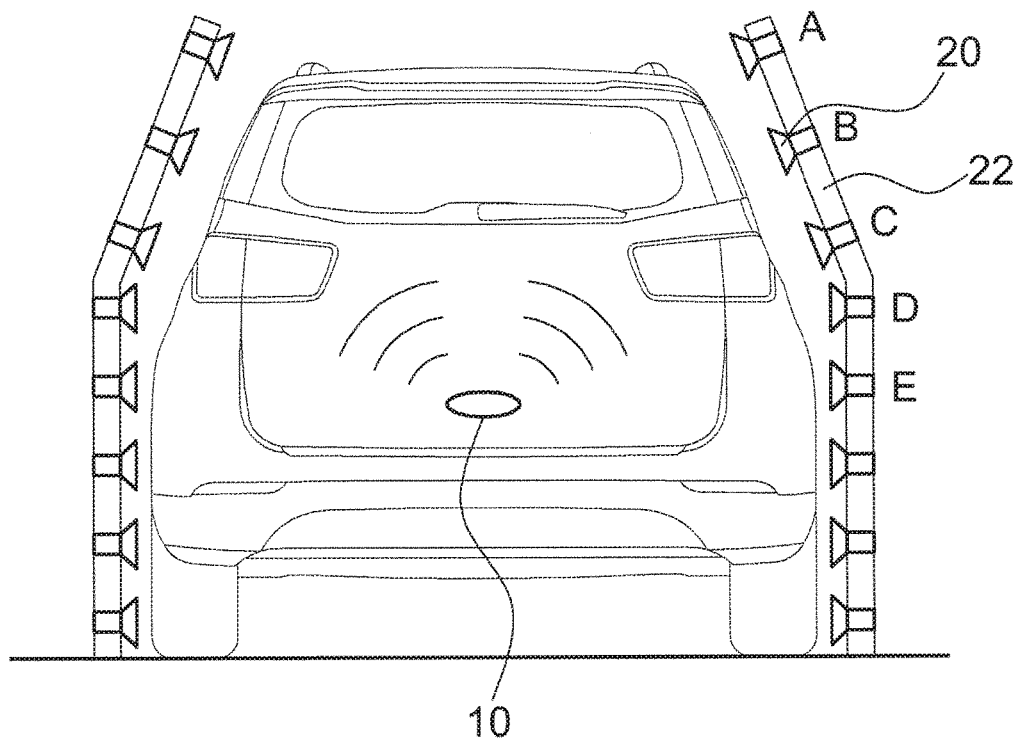
FIGS. 4A and 4B are view showing a construction of a system for detecting a water-leaking part of a vehicle according to the present disclosure.
Figure 4B:
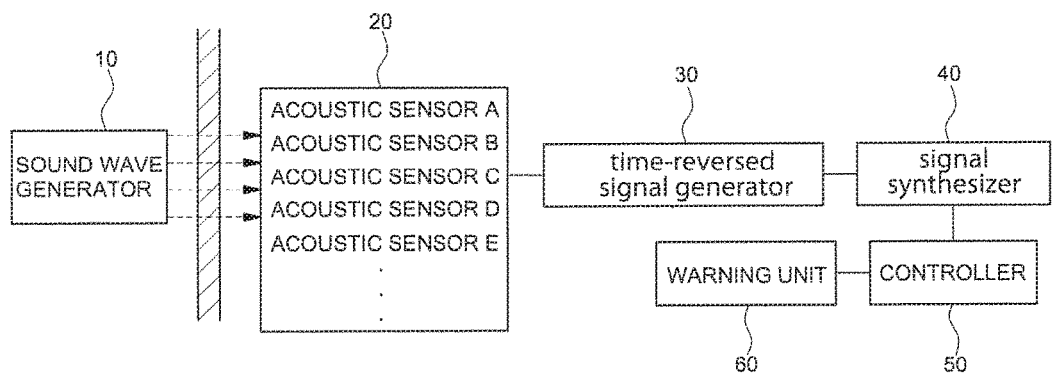
Figure 7:
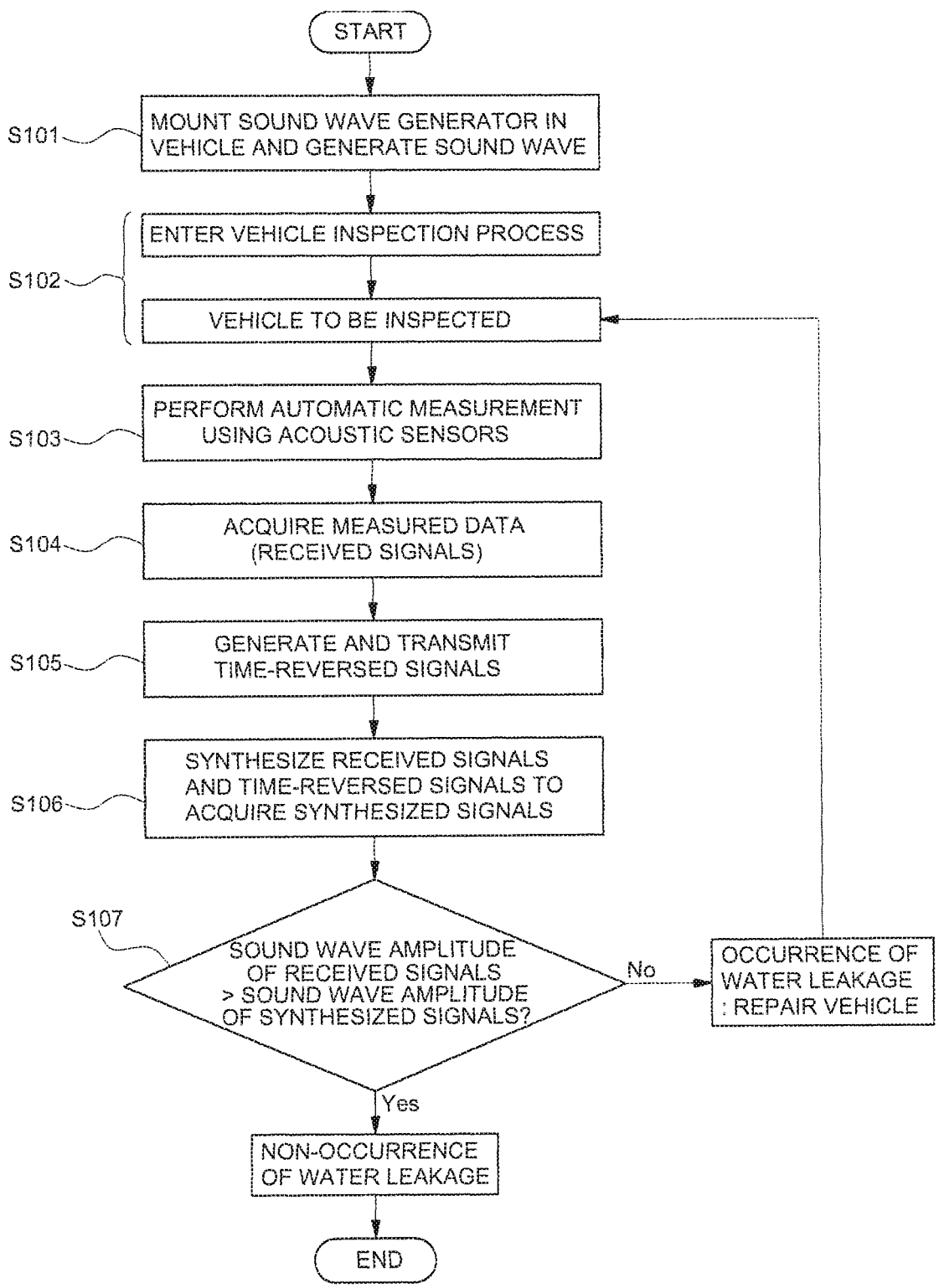
FIG. 7 is a flowchart showing a method of detecting the water-leaking part of the vehicle according to the present disclosure.

FIGS. 4A and 4B are views showing a construction of a system for detecting a water-leaking part of a vehicle according to the present disclosure, and FIG. 7 is a flowchart showing a method of detecting a water-leaking part of a vehicle according to the present disclosure.

Referring to FIG. 4A, a sound wave generator 10 is disposed in a vehicle to be inspected, and a plurality of acoustic sensors 20 is mounted to an acoustic sensor stand 22, which is disposed around the vehicle so as to surround the vehicle at a regular interval, According to a method of detecting a water-leaking part of a vehicle with reference to FIG. 7, the sound wave generator 10, which is disposed in the vehicle, generates a sound wave (S101). The vehicle moves close to the acoustic sensor stand 22 which includes the acoustic sensors 20 (S102).

Subsequently, the acoustic sensors 20 receive the sound wave generated by the sound wave generator 10 (S103 and S104).

Referring to FIG. 4B, a system for detecting a water-leaking part according to the present disclosure includes: a time-reversed signal generator 30 for time-reversing the sound wave signals received by the acoustic sensors 20 and for transmitting the time-reversed signals to the vehicle; a controller 50 configured to determine whether the vehicle has a water-leaking part based on the time-reversed signals generated by the time-reversed signal generator 30; and a signal synthesizer 40 for synthesizing the sound wave signals received by the acoustic sensors 20 and the time-reversed signals generated by the time-reversed signal generator 30.

After the acoustic sensors 20 receive the sound wave generated by the sound wave generator 10, the time-reversed signal generator 30 generates the time-reversed signals from the sound wave signals received by the acoustic sensors 20 using a time-reversal technique and then transmits the time-reversed signals to the vehicle (S105).

Figure 5:
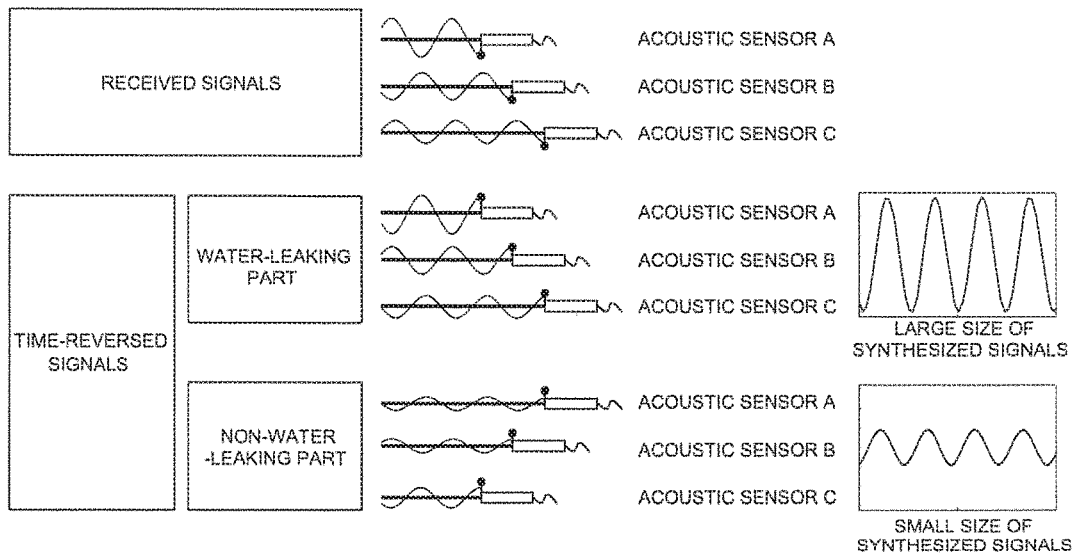
FIG. 5 is a conceptual view showing a method of detecting a water-leaking part of a vehicle according to the present disclosure.

For example, as shown in FIG. 5, a sound wave signal received from an acoustic sensor A, a sound wave signal received from an acoustic sensor B, and a sound wave signal received from an acoustic sensor C are converted into time-reversed signals, which are transmitted to the vehicle, irrespective of a water-leaking part or a non-water-leaking part of the vehicle.

Here, a Y axis indicates the amplitude of the sound wave and an X axis indicates time, a time-reversed signal is a signal obtained by converting the amplitude of the sound wave (the Y axis) in a symmetrical fashion on the basis of the X axis.

Figure 6:
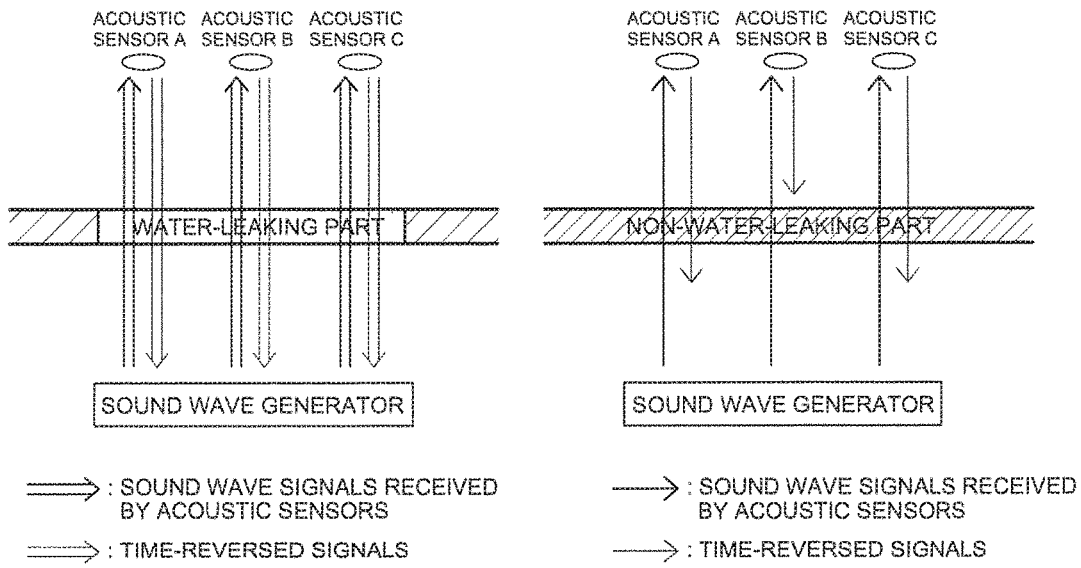
FIG. 6 is a waveform view showing an example of the method of detecting the water-leaking part of the vehicle according to the present invention.

Referring to FIG. 6, which shows sound wave signals received by the acoustic sensors A, B, and C and time-reversed signals of the respective sound wave signals, the sound wave signal received by the acoustic sensor A and the time-reversed signal thereof, the sound wave signal received by the acoustic sensor B and the time-reversed signal thereof, and the sound wave signal received by the acoustic sensor C and the time-reversed signal thereof have the same sound wave amplitude at a water-leaking part of the vehicle. Here, the sound wave signal received by each acoustic sensor and the time-reversed signal thereof are symmetric with respect to the time axis.

The reason that the sound wave signal received by each acoustic sensor and the time-reversed signal thereof have the same sound wave amplitude at the water-leaking part of the vehicle except that the sound wave signal received by each acoustic sensor and the time-reversed signal thereof are symmetric with respect to the time axis is that the vehicle has a water-leaking part, and thus, the sound wave is smoothly transmitted to inside and outside of the vehicle.

In other words, the sound wave signal received by each acoustic sensor and the time-reversed signal thereof have the same sound wave amplitude at the water-leaking part of the vehicle except that the sound wave signal received by each acoustic sensor and the time-reversed signal thereof are symmetric with respect to the time axis because the water-leaking part (the gap in the vehicle from which water leaks) serves as a path along which the sound wave is transmitted to the inside and the outside of the vehicle without resistance, as shown in the left portion of FIG.

Consequently, the sound wave generated by the sound wave generator 10, disposed in the vehicle, is received by the acoustic sensors 20, disposed outside the vehicle, through the gap in the vehicle from which water leaks, and the time-reversed signals from the time-reversed signal generation unit 30 are transmitted to the inside of the vehicle through the gap in the vehicle from hich water leaks. That is, the gap in the vehicle from which water leaks serves as the path along which the sound wave is transmitted to the inside and the outside of the vehicle, and therefore, the sound wave signal received by each acoustic sensor and the time-reversed signal thereof have the same sound wave amplitude at the water-leaking part of the vehicle except that the sound wave signal received by each acoustic sensor and the time-reversed signal thereof are symmetric with respect to the time axis.

On the other hand, referring to FIG. 6, which shows sound wave signals received by the acoustic sensors A, B, and C and time-reversed signals of the respective sound wave signals, the sound wave signal received by the acoustic sensor A and the time-reversed signal thereof, the sound wave signal received by the acoustic sensor B and the time-reversed signal thereof, and the sound wave signal received by the acoustic sensor C and the time-reversed signal thereof have different sound wave amplitudes at non-water-leaking parts of the vehicle.

The reason that the sound wave signal received by each acoustic sensor and the time-reversed signal thereof have different sound wave amplitudes at the non-water-leaking part of the vehicle is that the non-water-leaking part of the vehicle acts as a resistance element when the sound wave is transmitted.

In other words, the shape of the non-water-leaking part (for example, the interface between the door and the chassis) is not uniform, which can be curved or variously changed based on the type of the vehicle, and thus the non-water-leaking part acts as the resistance element when the sound wave is transmitted. As shown in the right portion of FIG. 5, therefore, the sound wave signals received by the acoustic sensor from the sound wave generator 10, disposed in the vehicle, through the non-water-leaking part and the time-reversed signals transmitted to the vehicle from the time-reversed signal generation unit 30 have different sound wave amplitudes.

Since the non-water-leaking part of the vehicle acts as the resistance element when the sound wave is transmitted, the time-reversed signals passing through the non-water-leaking part have non-uniform and small sound wave amplitudes, as compared with the time-reversed signals passing through the water-leaking part.

Subsequently, in order to correctly determine whether water is leaking from the vehicle, the signal synthesizer 40 synthesizes the sound wave signals received by the acoustic sensors 20 and the time-reversed signals transmitted by the time-reversed signal generator 30 (S106).

The signal synthesizer 40 may synthesize the sound wave signals received by the acoustic sensors 20 and the time-reversed signals at the water-leaking part, and transmit the synthesized signals to the controller 50. Alternatively, the signal synthesizer 40 may synthesize the sound wave signals received by the acoustic sensors 20 and the time-reversed signals at the non-water-leaking part, and transmit the synthesized signals to the controller 50.

When the sound wave signals received by the acoustic sensors 20 and the time-reversed signals at the water-leaking part are synthesized, the size of the synthesized signals becomes twice that of the sound wave signals received by the acoustic sensors 20 or more, since the sound wave signals and the time-reversed signals have the same size and waveform.

On the other hand, when the sound wave signals received by the acoustic sensors 20 and the time-reversed signals at the non-water-leaking part are synthesized, the size of the synthesized signals becomes less than that of the sound wave signals received by the acoustic sensors 20, since the sound wave signals and the time-reversed signals have different size and waveform. This is because the sound wave signals received by the acoustic sensors 20 and the time-reversed signals at the non-water-leaking part have different sizes and waveforms, and thus, the sound wave signals and the time-reversed signals are offset and accordingly not amplified when the sound wave signals and the time-reversed signals are synthesized.

Thereafter, the controller 50 determines whether the vehicle has a water-leaking part based on the signal syntheszied by the signal syntheszer 40 (S107).

More specifically, when the sound wave signals received by the acoustic sensors 20 and the time-reversed signals at the water-leaking part are synthesized, the size of the synthesized signals becomes twice that of the sound wave signals received by the acoustic sensors 20 or more, since the sound wave signals and the time-reversed signals have the same size and waveform. When the signal obtained by synthesizing the sound wave signals received by the acoustic sensors 20 and the time-reversed signals at the water-leaking part is greater than the sound wave signals received by the acoustic sensors 20, the controller 50 outputs a water leakage determination signal.

When the sound wave signals received by the acoustic sensors 20 and the time-reversed signals at the non-water-leaking part are synthesized, the size of the synthesized signals becomes less than that of the sound wave signals received by the acoustic sensors 20, since the sound wave signals and the time-reversed signals have different sizes and waveforms. When the signal obtained by synthesizing the sound wave signals received by the acoustic sensors 20 and the time-reversed signals at the non-water-leaking part is less than the sound wave signals received by the acoustic sensors 20, the controller 50 outputs a water non-leakage determination signal.

In this way, it is possible to correctly detect the water-leaking part of the vehicle using the time-reversal technique, in which the sound wave generated by the sound wave generator, disposed in the vehicle, is received by the acoustic sensors, the received sound wave signals are time-reversed, and then the time-reversed signals are transmitted to the vehicle.

When the controller 50 determines that water is leaking from the vehicle, a warning unit 60 (for example, a visual display or audio alarm generator) may be operated according to a signal from the controller 50 in order to indicate that the vehicle has a water-leaking part (a water leakage warning step).

As is apparent from the above description, the present disclosure has the following effects.

First, it is possible to correctly detect the water-leaking part of the vehicle using the time-reversal technique, in which the sound wave generated by the sound wave generator, disposed in the vehicle, is received by the acoustic sensors, the received sound wave signals are time-reversed, and then the time-reversed signals are transmitted to the vehicle.

Second, it is not necessary to prepare reference data based on the type of the vehicle, and accordingly it is possible to reduce cost and time necessary to inspect water leakage.

The invention has been described in detail with reference to exemplary embodiments thereof. However, be appreciated by those skilled in the art that changes may be made in these embodiments without departing from the principles and spirit of the invention, the scope of which is defined in the appended claims and their equivalents.

What is claimed is:

1. A system for detecting a water-leaking part of a vehicle, the system comprising:
   a sound wave generator disposed in a vehicle;
   a plurality of acoustic sensors disposed outside the vehicle and receiving a sound wave generated by the sound wave generator;
   a time-reversed signal generator configured to time-reverse sound wave signals received by the acoustic sensors and to transmit the time-reversed sound wave signals to the vehicle; and
   a controller configured to determine whether the vehicle has the water-leaking part based on the sound wave signals received by the acoustic sensors and the time-reversed sound wave signals generated by the time-reversed sound wave signal generator.

2. The system of claim 1, further comprising a signal synthesizer configured to synthesize the sound wave signals received by the acoustic sensors and the time-reversed sound wave signals generated by the time-reversed sound wave signal generator.

3. The system of claim 2, wherein the signal synthesizer separately transmits a signal obtained by synthesizing the sound wave signals received by the acoustic sensors and the time-reversed sound wave signals at the water-leaking part and a signal obtained by synthesizing the sound wave signals received by the acoustic sensors and the time-reversed sound wave signals at a non-water-leaking part to the controller.

4. The system of claim 1, wherein the controller determines that water leaks from the vehicle when a signal obtained by synthesizing the sound wave signals received by the acoustic sensors and the time-reversed sound wave signals at the water-leaking part is greater than the sound wave signals received by the acoustic sensors.

5. The system of claim 4, further comprising a warning unit for warning water leakage according to a signal from the controller when the controller determines that water is leaking from the vehicle.

6. A method of detecting a water-leaking part of a vehicle, the method comprising;
   disposing a sound wave generator in the vehicle and disposing a plurality of acoustic sensors outside the vehicle;
   receiving, by the plurality of acoustic sensors, a sound wave generated by the sound wave generator;
   time-reversing, by a time-reversed signal generator, sound wave signals received by the acoustic sensors and transmitting the time-reversed sound wave signals to the vehicle; and
   determining, by a controller, whether the vehicle has the water-leaking part based on the sound wave signals received by the acoustic sensors and the time-reversed sound wave signals.

7. The method of claim 6, further comprising synthesizing the sound wave signals received by the acoustic sensors and the time-reversed sound wave signals.

8. The method of claim 7, wherein the step of synthesizing comprises separately synthesizing a signal obtained by synthesizing the sound wave signals received by the acoustic sensors and the time-reversed signals at the water-leaking part and a signal obtained by synthesizing the sound wave signals received by the acoustic sensors and the time-reversed signals at a non-water-leaking part.

9. The method of claim 6, wherein the step of determining comprises determining water leakage from the vehicle when a signal obtained by synthesizing the sound wave signals received by the acoustic sensors and the time-reversed signals at the water-leaking part is greater than the sound wave signals received by the acoustic sensors.

10. The method of claim 9, further comprising warning the water leakage when the controller determines that water is leaking from the vehicle.

* * * * *